3,002,910
CATALYTIC CONVERSION OF ORGANIC COMPOUNDS USING PENETRATING RADIATION
James M. Caffrey, Jr., Beacon, N.Y., assignor to the United States of America as represented by the United States Atomic Energy Commission
No Drawing. Filed Jan. 5, 1959, Ser. No. 785,097
6 Claims. (Cl. 204—154)

The present invention relates to a method of converting hydrocarbons into useful products by means of energetic penetrating radiation. More particularly, it relates to a method of utilizing penetrating radiation to enhance certain solid catalysts for use in hydrogenating olefinic hydrocarbons to saturated compounds and converting said saturated compounds to branched chain structures.

The bulk irradiation of organic compounds has, in recent years, received extensive investigation. It has been found that highly energetic radiation, such as gamma rays, cause extensive changes in these compounds. For example, olefinic hydrocarbons are readily polymerized when exposed to gamma rays and other penetrating radiation. As little as .1 megaroentgen of gamma radiation will convert saturated hydrocarbons (alkanes) to a dimeric fraction, an olefinic fraction and a gaseous product consisting principally of methane and hydrogen.

It is an object of the present invention to alter the ratio of the various chemical products produced by the radiation of organic compounds as compared to the ratio of products produced by their bulk irradiation. A principal object of the present invention is to improve the properties of certain solid catalysts for use in converting organic compounds to useful chemical products. A further object of the invention is to activate solid catalysts for use in hydrogenating olefinic hydrocarbons derived from the radiolysis of alkanes and converting straight chain paraffin hydrocarbons (alkanes) to lower molecular weight straight chain and branched chain alkanes. Still another object of the invention is to upgrade a hydrocarbon mixture containing olefins and lower saturated hydrocarbons to increase the value of said mixture as a motor fuel. Other objects will, in part, be obvious and will, in part, be pointed out hereinafter.

As used in the following description, penetrating radiation will be understood to include energetic electromagnetic radiation capable of penetrating and at least partially passing through the materials treated. Neutrons of thermal energies and above, particle beams and X-rays as produced in high energy electrical devices, such as electron accelerators and the like, and radiation from radioactive sources are included in this term. The use of such energetic radiation to promote catalytic conversion of hydrocarbons will be discussed hereinafter in its two phases.

In accordance with the first phase of this invention, it is possible to activate a finely divided solid catalyst with radiation for use in hydrogenating olefinic hydrocarbons produced by the radiolysis of alkanes. A finely divided ferric oxide powder has been found useful as a catalyst for hydrogenating olefins in such a system. In accordance with this invention, I have found that when the ferric oxide containing certain chemical promoters is exposed to penetrating radiation under vacuum conditions or in an inert gas atmosphere prior to absorption of a vaporized or otherwise finely divided layer of an olefin on the surface of the irradiated catalyst under a relatively low partial pressure of hydrogen, the activity of the catalyst is improved. The increased activity is manifested by an increased degree of conversion of the olefin to a hydrogenated product in a given contact time.

The mechanism by which the increased activity of the irradiated ferric oxide catalyst takes place is not known. It thas been found, however, that only certain forms of the catalyst are activated by penetrating radiation.

The following examples are illustrative of the method of the present invention as it applies to the hydrogenation of olefins. Unless otherwise indicated, all of the examples were conducted at room temperature (i.e., at a temperature of about 25° C. to 27° C.).

EXAMPLE 1

A highly purified analytical grade ferric oxide, $Fe_2O_3$ (about 10 grams), having particles passing through a 325-mesh grid and a specific area of about 10 square meters per gram was placed in a reaction cell. The oxide sample was heated under vacuum at a temperature of about 350–400° C. for about four hours to remove adsorbed gases such as oxygen and water vapor. One cc. of isobutylene (S.T.P.) was then condensed onto the surface of the ferric oxide in each cell. Next, 10 cc. of hydrogen (S.T.P.) was introduced into the cell. The cell was then sealed hermetically and allowed to stand for about sixteen hours at room temperature after which the cell was attached to a vacuum system. The reaction products were desorbed from the oxide surface by heating the cell to about 100° C. and the desorbed products were condensed into a liquid nitrogen-cooled trap connected to the cell. The material which condensed in the trap was then transferred to a vapor chromatography apparatus where the individual components were isolated. In a second reaction cell, the same procedure was carried out on a 10 gram ferric oxide sample having the same particle size and specific area except that the ferric oxide contained approximately 100 parts per million (0.01%) each of magnesium and aluminum and 50 parts per million (0.005%) each of nickel, zirconium and manganese. These elements were present in the form of their respective oxides.

In a third reaction cell, 10 grams of a ferric oxide sample of the same particle size and specific area and containing the added metal oxides mentioned above was, prior to adsorption of olefin thereon, irradiated to a total gamma ray dosage of one megaroentgen under vacuum conditions. The same quantities of isobutylene and hydrogen were then adsorbed on the surface of the pre-irradiated ferric oxide powder. During 50 hours this pre-irradiated ferric oxide containing the isobutylene and hydrogen adsorbed thereon received a gamma ray dosage of 15 megaroentgens from a cobalt-60 source. After analyzing the reaction products from the analytical grade ferric oxide and the ferric oxide powder with added metal oxides, both irradiated and non-irradiated samples, it was found that the isobutylene had been completely converted to isobutane. There was no difference in the yield of isobutane between the irradiated and the non-irradiated samples. Thus, in these experiments, apparently irradiation and/or the presence of the added metal oxides had no effect on the activity of the ferric oxide as a hydrogenation catalyst. However, the experiments of Example 1 established these ferric oxides as heterogeneous hydrogenation catalysts for olefins.

EXAMPLE 2

A highly purified analytical grade ferric oxide, $Fe_2O_3$ (about 20 grams), as described in Example 1 was divided into two equal portions and placed in two separate reaction cells. Each cell was heated under vacuum at a temperature of about 350–400° C. for about four hours to remove adsorbed gases from the samples. One sample was pre-irradiated under vacuum to one megaroentgen of gamma rays. The n-pentane was distilled onto the surface of the pre-irradiated and non-irradiated samples. Both cells were hermetically sealed and allowed to stand for 50 hours. During this time both samples were exposed to 15 megaroentgens of gamma rays. The cells were then attached to separate vacuum systems and the seals were broken. The radiolysis products were collected as described in Example 1. Hydrogen and methane was determined by combustion analysis. The higher molecular weight products were isolated by vapor phase chromatography.

Next ferric oxide powder (about 20 grams), which contained the added metal oxides as described in Example 1, was divided into two equal portions and placed in two separate reaction cells. Each cell was heated under vacuum at a temperature of about 350–400° C. for about 4 hours to remove adsorbed gases. One portion of the ferric oxide powder containing the added metal oxides was pre-irradiated under vacuum to one megaroentgen of gamma rays. n-Pentane was distilled onto the surface of the pre-irradiated and non-irradiated powders containing the added metal oxides. Each cell was then hermetically sealed and allowed to stand for 50 hours during which time both samples were exposed to 15 megaroentgens of gamma rays. The radiolysis products were then collected and analyzed as described above, hydrogen and methane being determined by combustion analysis and the higher molecular weight products by vapor phase chromatography.

In another experiment n-pentane was distilled into a reaction cell which did not contain any solid adsorbent. The cell was hermetically sealed and allowed to stand for 140 hours during which time the n-pentane was exposed to 36 megaroentgens of gamma rays. The seal was then broken and the radiolysis products collected and isolated as described above. A summary of the hydrogen and olefin yields from these experiments is given below.

*Table I*

EFFECT OF PURITY AND PRE-IRRADIATION OF $Fe_2O_3$ ON HYDROGEN AND OLEFIN YIELD IN RADIOLYSIS OF ADSORBED PENTANE

| Grade of $Fe_2O_3$ | Pre-irradn.-r. | $H_2$ Formed in Moles per Roentgen per Gram $C_5H_{12} \times 10^{12}$ | Relative Yield of Olefins Adsorbed Pentane/Bulk Pentane |
|---|---|---|---|
| None | 0 | 3.5 | |
| Analytical | 0 | 3.1 | 1 |
| Do | $10^6$ | 3.4 | 1 |
| Added Metal Oxides | 0 | 2.2 | 0.7 |
| Do | $10^6$ | 0.4 | 0 |

It will be seen that the yields of hydrogen and olefin are markedly affected by the character of the ferric oxide used. The most marked effect was noted in the case where the n-pentane was adsorbed on the preirridated ferric oxide containing the added metal oxides. In that case the hydrogen yield was reduced by about 90%, and there was no detectable olefin yield.

Since the experiments in Example 1 had established that ferric oxide was a heterogeneous catalyst for the hydrogenation of olefins, it is clear that the olefins produced by the radiolysis of pentane had been converted to a hydrogenated product. An improvement in conversion of olefins derived from the radiolysis of an alkane to a hydrogenated product can be achieved by irradiating the pre-irradiated ferric oxide containing any of the added metal oxides and with the olefin adsorbed thereon with as little as 100,000 roentgens.

The effect of irradiation of the catalyst is dependent on the physical and chemical constitution of the catalyst to be treated. The ferric oxide should be finely divided and have a relatively large surface area. A powder with a specific area of the catalyst mass in excess of one square meter per gram is activated by irradiation, providing the ferric oxide has incorporated therein at least 0.005% by weight of an oxide of at least one metal selected from the group, aluminum, magnesium, nickel, zirconium and manganese. Optimum conversion of olefins produced by the radiolysis of alkanes to hydrogenated products is achieved by adsorbing a fine layer of the alkane, of the order of a monomolecular layer, on the surface of the ferric oxide.

Olefins derived from the radiolysis of alkanes, which can be treated in the same manner to convert them to saturated products, include the lower straight chain olefins such as ethylene, propene, butene, pentene, hexene, heptene, octene and nonene and other olefins containing as many as 30 carbon atoms in the molecule. The alkane may also contain up to 30 atoms in the molecule. The degree of branching of the alkane and olefin to be treated is immaterial for the purpose of producing a hydrogenated product.

The second phase of the invention relates to the production of a highly branched chain or isomeric hydrocarbon product by the irradiation of a straight or cranched chain hydrocarbon adsorbed on a mineral powder of large surface area.

EXAMPLE 3 n-Pentane obtained from Phillips Petroleum was purified by shaking it for 48 hours with concentrated sulfuric acid, washing it with a solution of potassium hydroxide, and then distilling it through a 20-plate bubble cap column. The distilled pentane was further purified by filtering it through a bed of silica gel in a column.

The various solid powders described in Table II below were treated in the following manner: The powder was preconditioned by evacuation at 300–450° C. followed by irradiation in vacuo with a total dosage of 1 megaroentgen of gamma rays from a cobalt-60 source. A fixed volume (about 10 cc.) of the irradiated powder was then weighed (in air) into an irradiation cell which had a vacuum break-off seal. The cell was heated to about 400° C. for one hour under vacuum after which the pentane was distilled onto the powder. The irradiation cell was then sealed under vacuum. The sample was then irradiataed at room temperature with cobalt-60 gamma rays at a dose rate of about 270,000 roentgens per hour to a total dosage of about 15 megaroentgens. (The dosage was arrived at on the basis of ferrous sulphate dosimetry.) After irradiation, the cell was opened into a vacuum system. The cell was then heated to 100° C. and the volatile material was distilled into a liquid nitrogen-cooled trap. The gaseous fraction, consisting principally of hydrogen, methane and a trace of ethane and ethylene, was pumped through the trap and thence to a Saunders-Taylor combustion analysis apparatus where the amounts of hydrogen and methane were determined. The material retained in the liquid trap was transferred to a vapor-phase chromatography apparatus consisting of a 2 meter long, 6 millimeter I.D. column containing tri-m-cresyl phosphate mixed with finely divided firebrick.

The yields, using a number of finely divided solid adsorbents, are summarized in Table II below. The yields of the various reaction products in the irradiation of pentane adsorbed on the solid adsorbents are given relative to the yields of the same products when the pentane was irradiataed to the same gamma dosage in bulk, that is, without the use of a solid adsorbent.

Table II

| Solid | SiO₂ gel | Ca·2SiO₂ | MgO |
|---|---|---|---|
| Percent Pentane by Weight of Solid— | 1.9 | 7.5 | 1.8 |

RELATIVE YIELDS: ADSORBED PENTANE/BULK PENTANE

| Product: | | | |
|---|---|---|---|
| $H_2$ | 12.0 | 1.5 | 0.7 |
| $CH_4$ | 3.0 | 0.8 | 1.4 |
| $(C_2H_6 C_2H_4)$ | 1.8 | 0.6 | 0.8 |
| $C_3H_8$ | 3.5 | 0.9 | 1.3 |
| $C_3H_6$ | 0.0 | 0.0 | 0.5 |
| i-$C_4H_{10}$ | 65.0 | 0.3 | 0.0 |
| n-$C_4H_{10}$ | 4.8 | 1.7 | 1.5 |
| $C_4H_8$ [a] | 0.0 | 0.0 | 0.0 |
| i-$C_5H_{12}$ | 9.3 | 0.6 | 0.6 |
| $C_5H_{10}$ [b] | 0.0 | 0.0 | 3.6 |
| i-$C_6$ [c] | (d) | (d) | (e) |

[a] Butene-1 plus isobutene.
[b] Probably mostly pentene-2.
[c] Constitution uncertain; may contain cyclopentane.
[d] Absent in bulk radiolysis; present in adsorbed radiolysis in amount comparable with isopentane.
[e] Not determined.

SOLIDS USED

| | Particle Diameter | Specific Surface (m.²/g.) | Supplier |
|---|---|---|---|
| Silica Gel (partially dehydrated silicic acids). | | 300 | Fisher Scientific Co. |
| Ca·2SiO₂ | 0.02 | 95 | Celite Division. |
| MgO | | 120 | Food Mach. & Chem. Co. |

It will be seen that the various irradiated solids containing the reactant hydrocarbons adsorbed thereon produced marked effects on the yields of various hydrocarbon products. The irradiation on silica gel is particularly striking in the yield of isomeric saturated hydrocarbons and in the yield of hydrocarbons lower than pentane. The effects produced are specific for each solid. For example, the large increases in isobutane and isopentane when silica gel was used was not evident when the solid adsorbent was calcium silicate, although the physical and chemical properties of the two materials are quite similar.

Pre-irradiation of the mineral powder is not necessary in order to produce a branched chain product. A branched chain product may be produced by irradiating the mineral powder having the reactant hydrocarbon adsorbed thereon. However, when the solid is pre-irradiataed, as little as 100,000 roentgens applied to the surface of the solid will convert the adsorbed reactant hydrocarbon to a branched chain product.

It has been found that the activity of the irradiated solid is a function of its surface area. A solid surface area of at least 10 square meters/gram has been found, on irradiation of said solid having the hydrocarbon adsorbed thereon, to produce an increased branched-chain-hydrocarbon yield. The yields of hydrogen and of hydrocarbons lower than pentane show that many times as much pentane is converted in the adsorbed state on the silica gel than is converted by the same radiation in bulk. In the case of the other solid adsorbents used, there was still a substantial increase in branched-chain isomeric products and lower hydrocarbons as compared to the bulk irradiation of pentane, although relative yield was not as great as in the case where the silica gel was the solid adsorbent.

Other saturated hydrocarbons may, in a similar manner, be adsorbed on the surface of finely divided silica gel and irradiated to produce high yields of isomeric branched-chain products and lower hydrocarbon products. For example, such straight-chain hydrocarbons as the butanes, hexanes, heptanes, octanes and higher hydrocarbons having as much as 30 carbons in the molecule may be treated in accordance with the second phase of this invention to produce highly branched and lower hydrocarbon products.

The mechanism by which the two phases increase the yield of hydrogenated products and isomeric products in accordance with this invention is not fully understood. A reasonable explanation appears to be that a transfer of energy from the solid to the adsorbed hydrocarbon takes place which enhances the yield of the various reaction products. It is believed that the energy of the radiation creates displacements and dislocations in the irradiated solid which convert the solid into a form that is more active catalytically.

Although the improvements in the two phases of this invention, as shown in the examples, was demonstrated with the use of gamma radiation, they can also be accomplished by irradiation with any of the energetic penetrating radiation of the kind defined above.

The combination of the two aspects of this invention is particularly useful in upgrading a gasoline mixture containing straight chain hydrocarbons and olefins to produce a motor fuel of increased octane rating. It will be apparent that such a mixture can be adsorbed on the surface of irradiated solid catalysts in accordance with this invention to produce a more desirable fuel. For example, a mixture of straight chain hydrocarbons and olefins can first be passed onto the surface of a silica gel catalyst and treated as in Example 3. The result of this contact will produce hydrogen and convert the straight chain hydrocarbons to highly branched forms. The resultant product, now containing hydrogen, olefins and lower branched hydrocarbon products, can now be adsorbed on a pre-irradiated ferric oxide catalyst containing small amounts of at least one of the selected oxide chemical promoters and treated in accordance with the procedure given in Example 2. The adsorbed olefin will then be hydrogenated to a saturated hydrocarbon product. Thereafter, if desired, the products recovered from the ferric oxide contact can be recycled in contact with the silica gel to produce a still more highly branched hydrocarbon mixture. Alternatively, the mixture of straight chain hydrocarbons and olefins can first be passed over the pre-irradiated ferric oxide containing the selected chemical promoters. The contacted ferric oxide is then irradiated as in Example 2 to produce a saturated hydrocarbon mixture. A branched-chain hydrocarbon product can then be produced by treating the saturated hydrocarbon mixture with a silica gel catalyst as in Example 3.

Since many embodiments might be made in the present invention and since many changes might be made in the embodiment described, it is to be understood that the foregoing description is to be interpreted as illustrative only and not in a limiting sense.

I claim:
1. A method of hydrogenating an olefinic hydrocarbon produced from the radiolysis of an alkane which comprises irradiating with high energy, ionizing radiation, in an inert atmosphere, a catalytically active ferric oxide to a total dosage of about 1 megaroentgen, said ferric oxide having a surface area of at least one square meter per gram and having incorporated therein about 0.005% of at least one oxide of a metal selected from the group consisting of aluminum, magnesium, nickel, zirconium and manganese, adsorbing an alkane on the surface of said catalyst and irradiating said catalyst containing said alkane adsorbed thereon to a total dosage of at least .1 megaroentgen in an atmosphere of hydrogen, to convert any olefin produced from the radiolysis of said alkane to a hydrogenated product and thereafter recovering said hydrogenated product.

2. The method according to claim 1 in which the alkane contains from 2 to 30 carbon atoms in the molecule.

3. The method according to claim 2 in which the alkane is pentane.

4. A method of hydrogenating an olefinic hydrocarbon produced from the radiolysis of an alkane which comprises irradiating with high energy, ionizing radiation, in an inert atmosphere, a catalytically active ferric oxide to a total dosage of about 1 megaroentgen, said iron oxide being further characterized in having a surface area of at least one square meter per gram and having incorporated therein about 0.005% by weight of at least one oxide of a metal selected from the group consisting of aluminum, magnesium, nickel, zirconium and manganese, adsorbing an alkane on the surface of said catalyst, irradiating said catalyst containing said alkane adsorbed thereon to a total dosage of .1–40 megaroentgens in an atmosphere of hydrogen, to convert any olefin produced from the radiolysis of said alkane to a hydrogenated product and thereafter recovering said hydrogenated product.

5. The method according to claim 4 in which the alkane contains from 2 to 30 carbon atoms in the molecule.

6. The method according to claim 5 in which the alkane is pentane.

References Cited in the file of this patent

UNITED STATES PATENTS

| | | |
|---|---|---|
| 2,350,330 | Remy | June 6, 1944 |
| 2,479,435 | Vesterdal | Aug. 16, 1949 |
| 2,707,706 | Bauch | May 3, 1955 |
| 2,872,396 | Wilson | Feb. 3, 1959 |
| 2,905,606 | Long et al. | Sept. 22, 1959 |
| 2,955,997 | Allen et al. | Oct. 11, 1960 |

OTHER REFERENCES

Caffrey et al.: "J. Phys. Chem.," pages 33–37, January 1958.

Clarke et al.: "Nature," pages 140–141, July 20, 1957.